United States Patent Office 3,740,391
Patented June 19, 1973

3,740,391
THERMOSETTING GLYOXALATED IONIC GLUCO-PYRANOSYL POLYMER AND WET STRENGTH PAPER HAVING A CONTENT THEREOF
Laurence Lyman Williams, Stamford, and Anthony Thomas Coscia, Norwalk, Conn., assignors to American Cyanamid Company, Stamford, Conn.
No Drawing. Continuation-in-part of applications Ser. No. 471,463, July 12, 1965, now abandoned, and Ser. No. 745,486, July 17, 1968, now Patent No. 3,556,932. This application Jan. 18, 1971, Ser. No. 107,461
Int. Cl. C08d 9/06
U.S. Cl. 260—233.3 R                    5 Claims

ABSTRACT OF THE DISCLOSURE

A water-soluble thermosetting wet-strengthening agent for paper is prepared by reacting an amidated ionic glucopyranosyl compound with glyoxal. Wet strength paper containing this polymer loses about half its wet strength during 24 hours of normal wet weathering when discarded, thereby alleviating the litter problem.

---

This is a continuation-in-part of our copending application Ser. No. 471,463 filed July 12, 1965, now abandoned and our copending application Ser. No. 745,486 filed July 17, 1968, now U.S. Pat. No. 3,556,932.

The present invention relates to a new water-soluble substantially linear thermosetting water-soluble ionic polymer carrying amide and glyoxalated amide substituents, to wet strength paper having a content of said polymer, and to the processes involved in the manufacture of the polymer and the paper.

Our parent application discloses that the water-soluble ionic polymers which consist essentially of linear vinyl "backbone" chains carrying glyoxalated amide substituents are valuable agents for use in the manufacture of paper. The application discloses that when water-laid webs of cellulose fibers which have an adsorbed content of said polymers are dried at normal temperatures in the range of 190°–250° F., the polymer molecules react with the cellulose and that in addition the polymer molecules cross-link among themselves, so that the resulting paper possesses very high wet strength. An important property of the polymer and of the wet strength paper is that about half of the wet strength which the polymer imparts and which the paper possesses is temporary and disappears when the paper is soaked in water for 24 hours at room temperature.

Permanent wet strength is often an unnecessary and indeed an undesirable property. The working life of paper towels, napkins and "personal" tissue in contact with moisture is rarely more than a few minutes, and a substantial part of the national litter problem results from the fact that discarded wet strength paper remains intact for a long period of time when discarded on the streets and in forests. Moreover, broke which possesses permanent wet strength is difficult to rework; cf. U.S. Pats. Nos. 2,394,273; 2,423,097 and 2,872,313. There is, therefore, a demand for wet strength paper which retains its wet strength during brief contact with moisture, but which loses much of its strength after a short period of natural weathering. Our parent application provides paper of this character.

The present invention provides a new polymer which possesses substantially the same properties as the polymer of our parent application and which provides paper of similar wet strength properties.

About half of the wet strength disappears after the paper has been soaked in water for 24 hours at room temperature. Paper broke of the present invention is readily pulped when soaked in water for 24 hours at room temperature and at a pH above 9.

The polymer of the present invention consists essentially of ionic water-soluble glucopyranosyl linkages carrying acrylamide substituents at least 0.05% whereof carry glyoxal substituents, the number of glyoxal substituents being sufficient to render the polymer thermosetting. These substituents have the theoretical formula

The paper of the present invention consists essentially of a water-laid web of cellulose papermaking fibers bonded together by cellulose-reacted and thermoset content of the aforesaid polymer.

The present invention provides the following special advantages.

(1) The polymer is easily prepared from low cost materials, and no special or complex apparatus is required.

(2) It provides a new field of use for starch.

(3) The paper disintegrates to a pulp comparatively rapidly during normal weathering when discarded, with consequent benefit to the ecology.

The polymer of the present invention consists essentially of glucopyranosyl linkages carrying a sufficient number of amide and glyoxalated amide substituents to impart respectively dry- and wet-strengthening properties to the polymer.

The number of ionic substituents present in the polymer need not be in excess of the minimum number needed to render the polymer substantive to cellulose fibers in aqueous suspension. A larger number of ionic substituents, however, is tolerated and accordingly, the number of these substituents normally falls between about 5 and 20 mol percent of the total number of linkages in the polymer.

The number of amide substituents present on the polymer is preferably as large as is practical because it is to these substituents in glyoxalated and non-glyoxalated state that the strengthening properties of the polymer are primarily ascribable. Preferably, the number of such substituents is 75–100 mol percent of the total number of linkages in the polymer, but the polymer possesses good strengthening properties when the number of amide substituents is as low as 50 mol percent of the total number of linkages in the polymer.

The number of glyoxal substituents are sufficient to render the polymer thermosetting. While 0.05 mol of these substituents per amide substituent present is sufficient to impart noticeable wet-strengthening properties to the polymer, a larger proportion produces much better strength. In practice we prefer that between 10% and 50% of the amide substitutents carry glyoxal substituents, and in this range best wet strengthening is imparted by each increment of glyoxal substituent present.

The polymers of the present invention can be prepared by a variety of methods.

According to one method, a water-soluble glucopyranosyl polymer is rendered cationic (cf. U.S. Pat. No. 2,935,436) and the resulting polymer is reacted with first acrylamide and then with glyoxal.

According to another method, a water-soluble glucopyranosyl polymer is reacted first with acrylamide (U.S. Pat. No. 2,938,026). The resulting polymer is then rendered cationic (cf. U.S. Pat. No. 3,051,691) and is then reacted with glyoxal.

According to still another method, a glucopyranosyl polymer is reacted with acrylamide and part of the acrylamide is hydrolyzed to carboxylic substituents rendering the polymer anionic (cf. U.S. Pat. No. 2,938,026), after which the polymer is reacted with glyoxal.

According to a further method, the glucopyranosyl polymer is reacted with acrylamide and then with glyoxal, after which the polymer is treated with sodium bisulfite as is shown in our parent application. An anionic thermosetting polymer is obtained which carries amide and glyoxalated amide substituents.

The glucopyranosyl linkage has the theoretical formula:

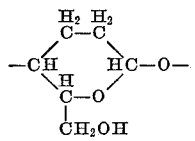

and any water-soluble linear polymer consisting essentially of this structure or an isomer or homolog thereof is suitable as a raw material for the practice of the present invention. Suitable linkages of this type are provided by boiled corn, potato, or other starch, and British gum, and by amylose and other dextrins.

The formula of the polymer of the present invention has not been ascertained because the locations of the ionic and amide substituents in the polymer have not been determined. The ionic substituents are introduced into the molecule by a variety of different reactions, and these reactions do not necessarily introduce the substituents into the same locations. Thus, the acrylamide may react with the hydroxymethyl substituent forming an ether linkage therewith, or it may react with any primary or secondary amino substituent present forming an amine linkage therewith. Thus, when the glucopyranosyl ring has a primary amino group attached thereto, subsequently added acrylamide condenses with these amino groups providing the ring with a substituent of the theoretical formula:

This substituent is cationic and provides a site with which glyoxal reacts.

Our evidence is that the glyoxal reacts with the amide substituents forming

substituents therefrom.

The number of glyoxal substituents need be only sufficient to render the polymer thermosetting. Substantially improved results are achieved with a larger number of glyoxal substituents than the amount mentioned above, and it is preferred that the number of these substituents be between about 10 and 50 mol percent of the amide substituents present. In this range, the polymer provides very satisfactory wet strength, and over-use of glyoxal is minimized.

The polymers of the present invention are produced as aqueous solutions which may exhibit and preferably do exhibit a colloidal haze when viewed by a transverse beam of light at 1% solids. The solutions are stable for at least a week when diluted to 10% solids by weight and adjusted to pH 3.

Paper of improved dry and wet strength is manufactured according to the present invention by forming an aqueous suspension of cellulose papermaking fibers at a pH between 4 and 8, adding thereto a suitable amount of the amidated and glyoxalated glucopyranosyl polymer together with alum if required, forming the fibers into a web, and drying the web on rolls having a surface temperature between 190° F. and 250° F.

Alum is used when the polymer is anionic, but is not required when the polymer is cationic. When the polymer is anionic, the suspension is sheeted at a pH in the range of 4–6. When the polymer is cationic, the pH of the suspension may be as high as about 8.

The polymer produces its wet-strengthening effect both by the formation of cross-linkages and by reaction with the cellulose of the fibers.

The resulting paper possesses the valuable property of losing about half of its wet strength when immersed in water at room temperature for 24 hours.

The invention is more fully described by the examples which follow. These examples are best embodiments of the invention and are not to be construed in limitation thereof.

EXAMPLE 1

The following illustrates the preparation of an anionic thermosetting starch-derived polymer having acrylamide and glyoxalated acrylamide substituents attached thereto.

To an aqueous solution of 40.0 g. (0.18 mol) of a cationic polymer substantially completely composed of glucopyranosyl linkages, 5% of the rings of which carry cationic nitrogen atoms (prepared according to U.S. Pat. No. 2,894,944) in 166 g. of water are added 2.0 g. of sodium hydroxide and 142.2 g. (2.0 mols) of acrylamide. The solution is stirred at 70° C. for one hour, acidified to pH 2.2 by addition of 2 N HCL, and poured into two liters of methanol at room temperature. A solid precipitates which is vigorously comminuted and agitated in three successive portions of methanol in a Waring Blendor and finally dried under vacuum.

To a solution of 5.0 g. (0.02 mol) of the foregoing product in 125 ml. of water (prepared by stirring a mixture of the two at 95°–98° C. for half an hour and cooling to room temperature) are successively added 3.0 g. of $Na_2HPO_4 \cdot 7H_2O$, sufficient 20% aqueous NaOH to adjust the pH of the solution to 7.9, 11 g. of water, and 6.3 g. of 40% aqueous glyoxal solution (0.043 mol).

The mixture is stirred for 1.5 to 2 hours at 50° C. until there is an appreciable increase in the viscosity of the solution. The reaction is terminated by adjusting the pH to 3.5 with hydrochloric acid diluting to 10% solids, and cooling.

A sample of water-leaf paper (filter paper) impregnated with a 0.5% by weight solution of the polymer and dried at 100° C. possesses good wet strength.

EXAMPLE 2

The following illustrates the preparation of water-soluble glucopyranosyl polymer of anionic charge carrying amide and glyoxalated amide substituents according to the present invention.

Starch carrying acrylamide and carboxylic substituents in about 100:13 (amide:carboxyl) molar ratio is prepared by reacting 40 g. of boiled corn starch (0.25 mol) with 17.5 g. (0.25 mol) of acrylamide and 1.0 g. of sodium hydroxide in aqueous solution at 70° C. for 30 minutes and precipitating the product by pouring the solution (acidified to pH 3) into a large volume of methanol as disclosed in Example 1 of U.S. Pat. No. 2,938,026. The reacted starch is recovered by filtration, washed with methanol in a Waring Blendor, dried at room temperature and dissolved in 300 cc. of water, and to the resulting solution is added 7.3 g. (0.13 mol) of glyoxal as a 40% aqueous solution. The solution is adjusted to pH 8 and stirred at 50° C. until its viscosity has noticeably increased but is short of the gel point. The solution is then cooled, diluted to 10% solids and acidified to pH 3.

EXAMPLE 3

The following illustrates the manufacture of neutral wet strength paper by use of a polymer according to the present invention.

To one portion of an aqueous suspension of well-beaten 50:50 bleached hardwood:bleached softwood cellulose papermaking fibers having a consistency of 0.6% is added sufficient of a 1% aqueous solution of the glyoxalated starch polymer of Example 1 to provide 0.25% of the polymer based on the dry weight of the fibers, and to another portion is added twice this amount of polymer solution. These procedures are repeated respectively with third and fourth portions, except that to each is also added 30% based on the weight of the polymer of the water-soluble non-thermosetting methylamine-epichlorohydrin polymer of Nagy copending application Ser. No. 778,934, now U.S. Pat. No. 3,567,659 as retention aid for the starch polymer.

The suspensions are then adjusted to pH 7.0 and formed into handsheets at a basis weight of 70 lb. per 25" x 40"/500 ream, which are dried for 2 minutes on a rotary drum drier having a drum temperature of 240° F.

The initial or "no soak" wet strength of the resulting sheets is as follows:

| Run | Percent added [1] | | Wet strength [2] |
|---|---|---|---|
| | Glyoxalated pyranosyl | Retention aid | |
| Blank | None | None | 1.4 |
| 1 | 0.25 | None | 1.3 |
| 2 | 0.50 | None | 1.7 |
| 3 | 0.25 | 0.075 | 2.2 |
| 4 | 0.50 | 0.150 | 3.9 |

[1] Based on dry weight of fibers.
[2] Initial, lb./in.

The suspensions are then adjusted to pH 7.0 and formed in water for 24 hours at room temperature.

EXAMPLE 4

The following illustrates the manufacture of dry and wet strength paper containing the anionic polymer of Example 2.

To an aqueous suspension of well-beaten 50:50 bleached softwood:bleached hardwood fibers having a consistency of 0.6% is added with gentle stirring 1% of alum based on the dry weight of the fibers followed by 0.5% of the polymer (added as the acid solution of Example 3), after which the pH of the suspension is adjusted to 5 and the fibers are formed into a wet web at 70 lb. per 24" x 40"/500 ream which is dried by two minutes on a laboratory rotary drier having a drum temperature of 240° F.

The resulting paper possesses very satisfactory dry strength and wet strength. The wet strength decreases by half when the paper is soaked in water for 24 hours at 20° C.

EXAMPLE 5

Example 1 is repeated except that a cationic starch is employed as starting material, 10% of the glucopyranosyl linkages carry dimethylamino substituents, prepared according to Caldwell et al. U.S. Pat. No. 2,813,093.

A cationic water-soluble thermosetting polymer is obtained which after application to fibers gives a useful wet strength paper.

We claim:

1. A water-soluble ionic glucopyranosyl polymer wherein 50–100 mol percent of the total number of linkages of the polymer carry acrylamide linkages, at least 0.05% whereof carry glyoxal substituents, the number of said glyoxal substituents being sufficient to render the polymer thermosetting.

2. An anionic polymer according to claim 1.

3. A cationic polymer according to claim 1.

4. A polymer according to claim 1 wherein the glucopyranosyl polymer is starch.

5. A polymer according to claim 1 wherein between 10% and 50% of the amide substituents carry glyoxal substituents.

References Cited

UNITED STATES PATENTS

| 3,549,568 | 12/1970 | Coscia et al. | 260—17.3 |
| 3,135,738 | 6/1964 | Cushing | 260—233.3 A |
| 3,556,932 | 1/1971 | Coscia et al. | 162—166 |
| 3,658,640 | 4/1972 | Coscia et al. | 162—166 |

WILLIAM H. SHORT, Primary Examiner

E. WOODBERRY, Assistant Examiner

U.S. Cl. X.R.

162—157 C, 166, 167, 168; 260—17.3, 17.4 ST, 233.3 A

UNITED STATES PATENT OFFICE
CERTIFICATE OF CORRECTION

Patent No. 3,740,391                                  Dated   June 19, 1973

Inventor(s) LAURENCE LYMAN WILLIAMS and ANTHONY THOMAS COSCIA

It is certified that error appears in the above-identified patent and that said Letters Patent are hereby corrected as shown below:

Column 5 line 24. "The suspensions are then adjusted to pH 7.0 and formed" should read -- The paper loses about half its strength when soaked --.

Signed and sealed this 12th day of March 1974.

(SEAL)
Attest:

EDWARD M. FLETCHER, JR.                    C. MARSHALL DANN
Attesting Officer                          Commissioner of Patents